United States Patent [19]
Shimode et al.

[11] Patent Number: 5,536,277
[45] Date of Patent: Jul. 16, 1996

[54] REACTIVE DYE COMPOSITION AND A METHOD FOR DYEING OR PRINTING OF FIBER MATERIALS USING THE SAME

[75] Inventors: Mitsuo Shimode; Nobuaki Kawamura; Shinichi Yabushita; Shuhei Hashizume, all of Osaka, Japan

[73] Assignee: Sumitomo Chemical Company, Ltd., Osaka, Japan

[21] Appl. No.: 361,498

[22] Filed: Dec. 22, 1994

[30] Foreign Application Priority Data

Dec. 24, 1993 [JP] Japan .................................. 5-329083

[51] Int. Cl.⁶ .................................................. C09B 62/505
[52] U.S. Cl. ........................... 8/549; 8/643; 8/675; 8/676; 8/680; 8/673
[58] Field of Search ............................. 8/549, 643, 675, 8/676, 680, 673

[56] References Cited

U.S. PATENT DOCUMENTS

| | | | |
|---|---|---|---|
| 4,088,441 | 5/1978 | Meininger et al. | 8/524 |
| 4,283,195 | 8/1981 | Nakatsuka et al. | 8/524 |
| 4,349,349 | 9/1982 | Nakatsuka et al. | 8/524 |
| 4,514,187 | 4/1985 | Schütz et al. | 8/531 |
| 5,131,919 | 7/1992 | Mäusezahl | 8/643 |
| 5,356,441 | 10/1994 | Tokieda et al. | 8/543 |

FOREIGN PATENT DOCUMENTS

| | | |
|---|---|---|
| 300195 | 1/1989 | European Pat. Off. . |
| 0387201 | 9/1990 | European Pat. Off. . |
| 60-108472 | 6/1985 | Japan . |

OTHER PUBLICATIONS

*Patent Abstracts of Japan*, vol. 9, No. 254 (C–308) [1977], 11 Oct. 1985 & JP–A–60 108472 (Kasei Hekisuto K.K.) 13 Jun. 1985.

*Primary Examiner*—Margaret Einsmann
*Attorney, Agent, or Firm*—Watson Cole Stevens Davis

[57] ABSTRACT

A reactive dye composition which contains a dye mixture comprising; at least one reactive dye selected from dyes represented by the following formula (I):

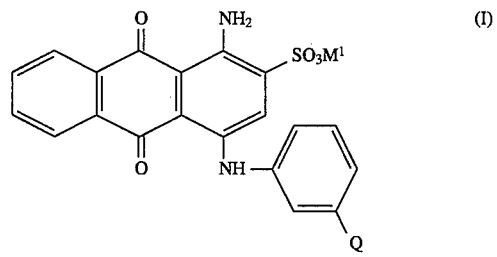

in which Q is $—SO_2CH_2CH_2Z$ in which Z is a group splittable by the action of alkali or $—SO_2CH=CH_2$, and $M^1$ is hydrogen, an alkali metal or an alkaline earth metal, and at least one anthraquinone compound usable as an acid dye; and a process for dyeing or printing a fiber material using the reactive dye composition.

14 Claims, No Drawings

REACTIVE DYE COMPOSITION AND A METHOD FOR DYEING OR PRINTING OF FIBER MATERIALS USING THE SAME

The present invention relates to a reactive dye composition having excellent solubility and stability in water and aqueous alkaline dyeing liquors. The present invention also relates to a method for dyeing or printing of fiber materials, particularly cellulose fiber materials or cellulose containing fiber materials, evenly and with high reproducibility using the reactive dye composition.

Hitherto, reactive dyes have been widely used for dyeing or printing of cellulose fiber materials. For dyeing or printing of the fiber materials, various processes, such as exhaust dyeing process, one-bath padding process, cold batch-up process and one phase printing, have been conducted.

According to these processes, in order to produce level dyeing and prints free from specks, a reactive dye having sufficient solubility and stability, i.e. free from deposition and gelation in dyeing solutions, in padding solutions and in printing pastes is required. For example, in cold-batch-up process in which an alkaline aqueous solution containing alkali, such as sodium hydroxide, sodium carbonate, trisodium phosphate or sodium silicate is used for preparation of padding liquors, it is desired that dyeing is completed without a physical state change of dye such as a deposition or a gelation in the dyeing bath during padding. For preparing a dyeing solution for an exhaustion dyeing, a reactive dye having sufficient solubility in aqueous solution containing large amount of inorganic salts such as sodium sulfate or sodium chloride or above-mentioned alkali is desired.

Under the situation mentioned above, improvement of solubility of C. I. Reactive Blue 19, which has been in a large demand as an anthraquinone reactive blue dye, has been strongly demanded and various methods for improving the solubility have been proposed. For example, in JP-A-55-107582, a process comprising addition of a condensate of alkylnaphthalene and formaldehyde is proposed. In JP-A-60-108472, a process comprising addition of a compound represented, in the free acid form, by the following formula;

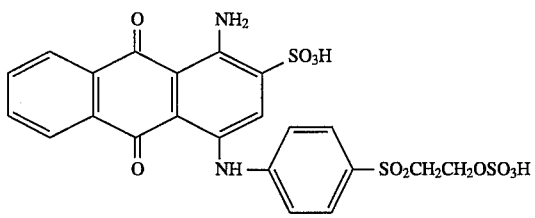

is proposed.

However, according to the conventional methods, either solubility of the reactive dye in water or an aqueous alkaline liquor and stability of the solution are not sufficient yet. Hence, further improvements in solubility and in solution stability have been strongly desired. A dyestuff product containing a dye in higher concentration is also demanded from a viewpoint of work-environment, storage or transportation of the product.

It is an object of the present invention to provide a reactive dye composition having excellent solubility in water or in an aqueous alkaline liquor, giving a stable dyeing solution free from deposition of dye during dyeing, storage or transportation, and giving evenly and deeply colored dyed or printed products in good reproducibility.

The present invention provides a reactive dye composition which contains a dye mixture comprising; at lest one reactive dye selected from dyes represented by the following formula (I):

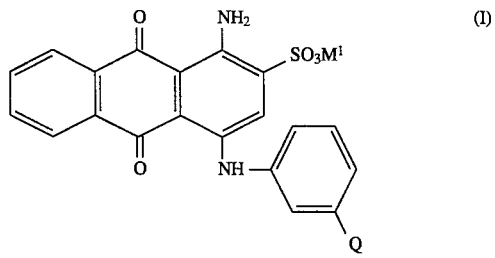

in which Q is —$SO_2CH_2CH_2Z$ in which Z is a group splittable by the action of alkali or —$SO_2CH=CH_2$ and $M^1$ is hydrogen, an alkali metal or an alkaline earth metal; and at least one anthraquinone compound usable as an acid dye.

The present invention also provides a process for dyeing and printing of fiber materials using the said reactive dye composition.

The reactive dye of the formula (I) is a known reactive dye. Examples of the group splittable by the action of alkali include sulfate ester, thiosulfate ester, phosphate ester, acetate ester and a halogen atom. Among them, sulfate ester is particularly preferred. A reactive dye of the formula (I) in which Q is —$SO_2CH_2CH_2Z$ and Z sulfate ester is a well-known reactive blue dye, C. I. Reactive Blue 19.

In the present invention, the reactive dye of the formula (I) can be used either singly or as a mixture of the dye of the formula (I) in which Q is —$SO_2CH_2CH_2Z$ (Z is as defined above) and the dye of the formula (I) in which Q is —$SO_2CH=CH_2$.

The anthraquinone compound used in the present invention is not limited as long as it can be used as an acid dye, although following compound is preferred: a compound represented by the following formula (II),

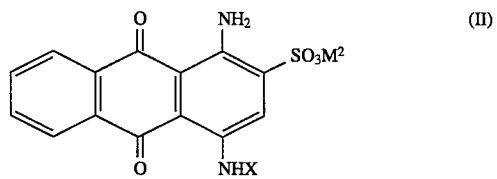

in which X is cyclohexyl, unsubstituted phenyl, or phenyl which is substituted by halogen, sulfo, cyano, alkyl, lower alkoxycarbonyl, optionally substituted lower alkylsulfonyl, —$NR^1R^2$, —$SO_2NR^1R^2$ or —$CH_2NR^1R^2$ in which $R^1$ is hydrogen or lower alkyl and $R^2$ is hydrogen, optionally substituted lower alkyl, optionally substituted lower alkylcarbonyl, optionally substituted phenylcarbonyl, lower alkylsulfonyl or optionally substituted phenylsulfonyl and $M^2$ is hydrogen, an alkali metal or an alkaline earth metal.

When X is substituted phenyl, alkyl which can be a substituent of the phenyl includes alkyl having 1 to 12 carbon atoms, among which alkyl having 1 to 4 carbon atoms is preferred.

Examples of the lower alkoxycarbonyl include carbonyl substituted by alkoxy having 1 to 4 carbon atoms such as ethoxycarbonyl. Examples of the optionally substituted lower alkylsulfonyl include sulfonyl substituted by unsubstituted or substituted alkyl having 1 to 4 carbon atoms such as hydroxyethylsulfonyl.

Lower alkyl as $R^1$ or $R^2$ includes alkyl having 1 to 4 carbon atom. When $R^2$ is substituted lower alkyl, lower alkylcarbonyl or lower alkylsulfonyl, examples of a group which can be a substituent of the lower alkyl, lower alkylcarbonyl or lower alkylsulfonyl include chlorine and hydroxy. When $R^2$ is substituted phenylcarbonyl or phenylsulfonyl, examples of a group which can be a substituent of the phenylcarbonyl or phenylsulfonyl include alkyl having 1 to 4 carbon atoms. When $R^1$ or $R^2$ is lower alkyl, examples of the lower alkyl include hydroxyethyl. When $R^2$ is optionally substituted lower alkylcarbonyl, examples of the lower alkylcarbonyl include methyl carbonyl. When $R^2$ is optionally substituted phenylcarbonyl, examples of the phenylcarbonyl include benzoyl. When $R^2$ is lower alkylsulfonyl, examples of the lower alkylsulfonyl include methylsulfonyl. When $R^2$ is optionally substituted phenylsulfonyl, examples of the phenylsulfonyl include tosyl.

As X in the formula (II), cyclohexyl, unsubstituted phenyl or phenyl substituted by at least one group selected from sulfo, alkyl having 1–4 carbon atoms, amino or acetylamino is preferred.

As examples of the anthraquinone compounds of the formula (II), known acid dyes such as C.I. acid blue 25, C.I. acid blue 40, C.I. acid blue 41, C.I. acid blue 51, C.I. acid blue 53, C.I. acid blue 62, C.I. acid blue 129, C.I. acid blue 145, C.I. acid blue 182, C.I. acid blue 230, C.I. acid blue 260, C.I. acid blue 264, C.I. acid blue 277:1 can be mentioned, although the anthraquinone compounds of the formula (II) is not limited to them. The anthraquinone compounds of the formula (II) can be easily produced according to a known method.

The amount of the anthraquinone compound used as an acid dye is not limited in the present invention, but preferably the amount is 1 weight part or more per 100 weight parts of the reactive dye of the formula (I). There is no upper-limit of the amount. As long as the properties of the reactive dye of the formula (I) is not adversely affected, any amount of the anthraquinone compound can be used, but, from the economical view point, it is preferably used in at most 30 weight parts or less per 100 weight parts of the reactive dye.

The reactive dye of the formula (I) and the anthraquinone compound usable as an acid dye can be used either in the free acid form, in the form of an alkali metal or alkaline earth metal salt form or a mixture thereof. Particularly preferred is sodium salt, potassium salt or lithium salt.

The reactive dye composition of the present invention may further comprise a usual dissolving auxiliary. Examples of the dissolving auxiliary include a condensation product of optionally alkylated naphthalene sulfonic acid with formaldehyde; a lignin sulfonic acid type dissolving auxiliary such as sodium lignin sulfonate; an anionic or nonionic surfactant such as polyoxyalkylene-substituted phenyl ether; polyoxyalkylene-substituted phenyl ether; polyoxyalkylenealkylether; ε-caprolactam; and pyrrolidone type dissolving auxiliary such as methyl pyrrolidone and polyvinyl pyrrolidone. Among them, a condensation product of optionally alkylated naphthalene sulfonic acid with formaldehyde is particularly preferred. Known condensation products of optionally alkylated naphthalene sulfonic acid with formaldehyde, including salts thereof, such as the product mentioned in JP-A-51-52435 and the product mentioned in JP-A-143257 can be used. As the product, a condensation product of naphthalene sulfonic acid substituted by 0 to 3 alkyl groups having 1 to 4 carbon atoms is preferred, and a condensation product of naphthalene sulfonic acid substituted by one or two methyl or ethyl is particularly preferred. Either one kind of the naphthalene sulfonic acid or mixture of two or more kinds of the naphthalene sulfonic acid can be used to produce the condensation product. Preferable average condensation degree of the condensation products is 1.1 to 3.0. Preferable sulfonation degree of the naphthalene sulfonic acid is 50–150%. The condensation product is used in an amount of 1 weight part or more per 100 weight parts of the reactive dye composition. Although there is no upper-limit of the amount, it is preferably used in at most 50 weight parts or less per 100 weight parts of the reactive dye from the economical view point.

If desired, the reactive dye composition of the present invention may further contain an inorganic salt such as sodium sulfate, a dispersing agent, a dust inhibitor, a pH stabilizer, a softening agent such as polyphosphates, a deforming agent and other dyeing aids.

The reactive dye composition of the present invention can be prepared by mixing a dye mixture consisting of the reactive dye of the formula (I) and an anthraquinone compound usable as an acid dye and, if necessary, a dissolving auxiliary such as a condensation product of optionally alkylated naphthalene sulfonic acid with formaldehyde, and a dyeing aid according to a known method. The manner of the mixing is not limited. For example, the mixing can be carried out during the preparation of the reactive dye; or the ingredients of the composition can be mixed before dyeing is carried out; or each ingredient may be added to the dyeing bath when dyeing is carried out.

The reactive dye composition of the present invention may be used, if desired, in combination with other dyes in order to obtain a desired color. Although known reactive dyes may be used for the other dye, following dyes are preferred as the other dye: a dye having at lest one reactive group selected from sulfatoethylsulfone, vinylsulfone, monochlorotriazine, monofluorotriazine, monopyridiniotriazine, dichlorotriazine, difluoromonochloropyrimidine or trichloropyrimidine; a dye being on the market with the name of Sumifex, Sumifix Supra, Remazol, Levafix, Procion, Cibacron, Basilen, Drimarene, Kayacion or Kayaceron React; or a dye mentioned in JP-A-50-178, JP-A-56-9483, JP-A-56-15481, JP-A-56-118976, JP-A-56-128380, JP-A-57-2365, JP-A-57-89679, JP-A-47-143360, JP-A-59-15451, JP-A-58-191755, JP-A-59-96174, JP-A-59-161463, JP-A-60-6754, JP-A-60-123559, JP-A-60-229957, JP-A-60-260654, JP-A-60-155469, JP-A-63-77974, JP-A-225665, JP-A-1-185370 or JP-A-3-770. Particularly, a dye having at least one reactive group selected from sulfatoethylsulfone, vinylsulfone, monochlorotriazine and monofluorotriazine; or a dye being on the market with the name of Sumifix, Sumifix Supra, Remazol, etc. is preferred.

The form of the reactive dye composition of the present invention is not limited. For example, the form may be a powder form, a granular form or a aqueous solution prepared according to a known method. When the form is an aqueous solution, the content of the dye mixture is preferably 5 to 50 weight % based on the weight of the solution.

The cellulose fiber material and the cellulose containing fiber material to which the present invention can be applied are not limited. Examples of the cellulose fiber material include a natural or a regenerated cellulose fiber such as cotton, linen, hemp, jute, ramie fiber, rayon, cupra or polynogic. Examples of the cellulose containing fiber material include cotton/polyester blending, cotton/acetate blending, cotton/nylon blending, cotton/wool blending, cotton/silk blending and rayon polyester blending.

The dyeing and printing in the present invention can be carried out according to a known manner. For example, an exhaustion dyeing can be conducted by further using a known inorganic neutral salt such as sodium sulfate or sodium chloride, and a known acid-binding agent such as sodium carbonate, sodium hydrogen carbonate, sodium hydroxide or sodium triphosphate, singly or in combination of two or more. The amount of the inorganic neutral salt and acid-binding agent in a dye bath is not limited but 1 g/l or more is preferred. The amount may be 200 g/l or more, but even when the amount is small such as 40 g/l or less, sufficient dyeing can be conducted according to the present invention. The inorganic neutral salt or acid-binding agent may be added to the dye bath at one time or dividedly according to a conventional manner. Other auxiliary agents, such as a leveling agent, a dye-retardant, a penetrant or a in-bath softener can be further added to the dye-bath. Dyeing temperature is usually from 30° to 95° C.

For example, a cold batch-up process can be carried out by padding a fiber material using a known inorganic neutral salt such as sodium sulfate or sodium chloride, and a known acid-binding agent such as sodium hydroxide or sodium silicate, followed by leaving the fiber material in a sealed packing material at a specific temperature.

As a continuous dyeing process, one-bath pad process or two-bath pad process can be exemplified. In one-bath pad process, padding the fiber material is carried out in a dye-padding liquor containing a known acid-binding agent such as sodium carbonate or sodium hydrogen carbonate, followed by intermediate drying and steaming or dry-heating treatment according to a known manner to perform the dye-fixation. In two-bath pad process, after dye-padding the fiber material, padding is carried out with a known inorganic neutral salt such as sodium sulfate or sodium chloride, and a known acid-binding agent such as sodium hydroxide or sodium silicate, and then intermediate drying and steaming or dry-heating treatment according to a known manner is carried out to perform the dye-fixation.

Printing can be carried out in a one phase method or a two phase method. A one phase method may be carried out by printing the fiber material with a printing paste containing a known acid-binding agent such as sodium hydrogen carbonate, followed by intermediate drying and steaming or dry-heating treatment. A two phase method may be carried out by printing the fiber material with a printing paste, followed by intermediate drying and passing the fiber material through a hot solution above 80° C. containing a known inorganic neutral salt such as sodium chloride and a known acid-binding agent such as sodium hydroxide or sodium silicate.

Dyeing process and printing process are not limited to the processes mentioned above.

According to the present invention, a reactive dye composition having excellent solubility and stability in water and an aqueous alkaline dyeing liquors is obtained. The reactive dye composition of the present invention does not give specks caused by dye-aggregation due to insufficient stability of dye in alkaline solution. The reactive dye gives evenly and deeply colored dyed product or printed product with good reproducibility.

According to the present invention, a product containing the reactive dye in higher content, comparing to conventional method, can also be obtained.

The present invention will be further explained with following Examples which are only illustrative, but most not be interpreted to limit the invention. In the Examples, part and "%" are by weight.

EXAMPLE 1

100 parts of a reactive dye represented by the following formula (a),

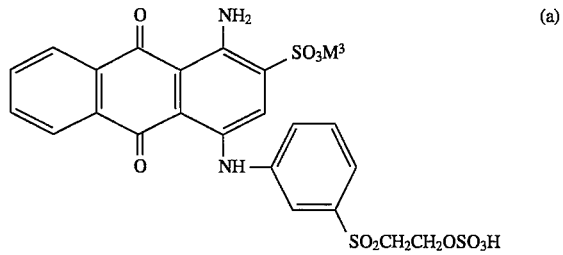

in which $M^3$ is H or Na, 5 parts of a compound represented by the following formula (2),

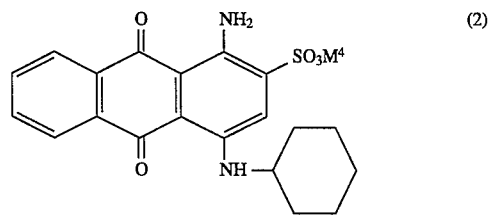

in which $M^4$ is H or Na, 15 parts of a condensation product of monomethylnaphthalene sulfonic acid having a sulfonation degree of 110% with formaldehyde (sodium salt) of which the average condensation degree is 1.8 and 4 parts of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

(b) Even after the padding liquor obtained in (a) was left for 120 minutes at 25° C., no deposition of the eye was observed. This result shows good stability of the padding liquor.

Above-mentioned dyeing process was repeated several times and the results exhibited good dyeing reproducibility.

EXAMPLE 2

100 parts of a reactive dye of the above-mentioned formula (1), 10 parts of a compound of the above-mentioned formula (2) and 1 part of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

(b) Even after the padding liquor obtained in (a) was left for 120 minutes at 25° C., no deposition of the eye was observed. This result shows good stability of the padding liquor.

Above-mentioned dyeing process was repeated several times and the results exhibited good dyeing reproducibility.

EXAMPLE 3

95 parts of a reactive dye represented by the following formula (3),

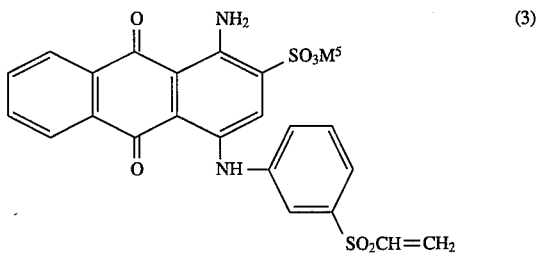

in which $M^5$ is H or Na, 5 parts of a reactive dye of the above-mentioned formula (1), 10 parts of a compound of the above-mentioned formula (2), 20 parts of a condensation product of monoethylnaphthalene sulfonic acid having a sulfonation degree of 110% with formaldehyde (sodium salt) of which the average condensation degree is 1.8 and 8 parts of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

(b) Even after the padding liquor obtained in (a) was left for 120 minutes at 25° C., no deposition of the dye was observed. This result shows good stability of the padding liquor.

Above-mentioned dyeing process was repeated several times and the results exhibited good dyeing reproducibility.

EXAMPLE 4

100 parts of a reactive dye of above-mentioned formula (1), 5 parts of a compound represented by the following formula (4),

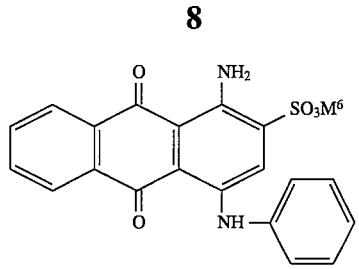

in which $M^6$ is H or Na, 15 parts of a condensation product of dimethylnaphthalene sulfonic acid having a sulfonation degree of 110% with formaldehyde (sodium salt) of which the average condensation degree is 1.8 and 1 part of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

(b) Even after the padding liquor obtained in (a) was left for 120 minutes at 25° C., no deposition of the dye was observed. This result shows good stability of the padding liquor.

Above-mentioned dyeing process was repeated several times and the results exhibited good dyeing reproducibility.

EXAMPLE 5

100 parts of a reactive dye of the above-mentioned formula (1), 10 parts of a compound of the above-mentioned formula (4) and 1 part of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

(b) Even after the padding liquor obtained in (a) was left for 120 minutes at 25° C., no deposition of the dye was observed. This result shows good stability of the padding liquor.

Above-mentioned dyeing process was repeated several times and the results exhibited good dyeing reproducibility.

EXAMPLE 6

100 parts of a reactive dye of the above-mentioned formula (1), 30 parts of a compound represented by the following formula (5),

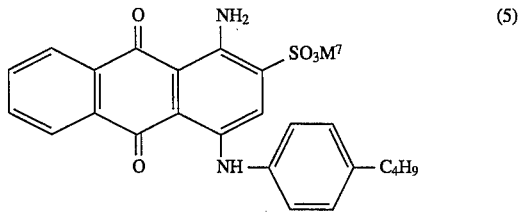

in which $M^7$ is H or Na, 15 parts of a condensation product of dimethylnaphthalene sulfonic acid having a sulfonation degree of 110% with formaldehyde (sodium salt) of which the average condensation degree is 1.8 and 1 part of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cupra, regenerated cellulose fiber, was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

(b) Even after the padding liquor obtained in (a) was left for 120 minutes at 25° C., no deposition of the dye was observed. This result shows good stability of the padding liquor.

Above-mentioned dyeing process was repeated several times and the results exhibited good dyeing reproducibility.

EXAMPLE 7

50 parts of a reactive dye of above-mentioned formula (1), 50 parts of a reactive dye of above-mentioned formula (3), 5 parts of a compound of above-mentioned formula (5), 15 parts of a condensation product of dimethylnaphthalene sulfonic acid having a sulfonation degree of 110% with formaldehyde (sodium salt) of which the average condensation degree is 1.8 and 8 parts of anhydrous sodium sulfonate were fully mixed to obtain a reactive dye composition.

(a) 100 g of the reactive dye composition thus obtained was dissolved in hot water and then the solution was cooled to 25° C. To the solution, 1 g of sodium alginate, 10 g of sodium meta-nitrobenzene sulfonate and 20 g of sodium hydrogen carbonate were added and then water was further added to prepare 1l of a padding liquor at 25° C. Immediately after the preparation of the padding liquor, a cotton fabric was treated in a known manner with this padding liquor. During the padding operation, no aggregation was observed in the padding liquor. The dyed cotton fabric was dried for 1 minute at 120° C. immediately and steaming was carried out for 3 minutes at 100° C. Then, the dyed fabric was rinsed in a conventional manner to remove the unfixed dye and finished by drying. A deep, level and brilliant blue dyed product free from specks was obtained.

EXAMPLE 8

100 kg of mercerized knitted cotton was set in a jet-dyeing machine, and then the liquor ratio and water temperature were adjusted at 1:10 and 50° C., respectively.

100 parts of a reactive dye of the above-mentioned formula (1), 10 parts of a compound represented by the following formula (6),

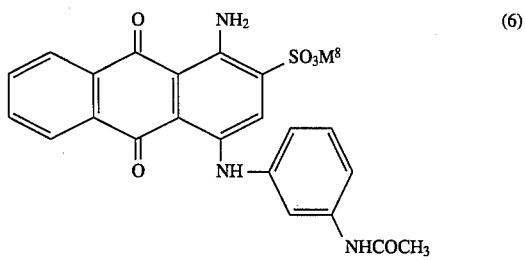

in which $M^8$ is H or Na, 15 parts of a condensation product of dimethylnaphthalene sulfonic acid having a sulfonation degree of 110% with formaldehyde (sodium salt) of which the average condensation degree is 1.8 and 1 part of anhydrous sodium sulfonate were fully mixed to obtain a reactive dye composition.

5 kg of the reactive dye composition thus obtained was dissolved according to a known method, then the solution was added to the bath of which water temperature was then kept at 50° C. To the solution, 50 kg of anhydrous sodium sulfate was added according to a known manner and the cloth was treated at that temperature for 30 minutes. Then, 20 kg of sodium carbonate was added thereto according to a known manner and the cloth was treated at that temperature for 60 minutes to finish the dyeing. After the addition of the sodium carbonate, no aggregation of the dye was observed.

Then, the dyed fabric was rinsed in a conventional manner to remove the unfixed dyes and finishing by drying.

EXAMPLE 9

65 parts of a reactive dye of above-mentioned formula (1), 10 parts of a compound represented by the following formula (7),

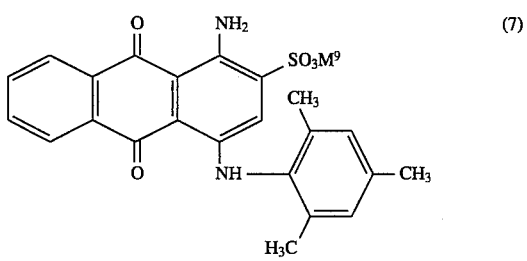

in which $M^9$ is H or Na, 15 parts of a condensation product of monomethylnaphthalene sulfonic acid having a sulfonation degree of 110% with formaldehyde (sodium salt) of which the average condensation degree is 1.8 and 0.3 part of anhydrous sodium sulfonate were fully mixed to obtain a reactive dye composition.

100 g of the reactive dye composition thus obtained was dissolved in hot water and then the solution was cooled to 25° C. To the solution, 150 g of 50° Bé sodium silicate and 15 ml of 35% aqueous sodium hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in an ambient temperature of 28° C. for 10 hours. Then, the dyed fabric was rinsed in a conventional manner to remove the unfixed dye and finished by drying. A deep, level and brilliant blue dyed product free from specks was obtained.

EXAMPLE 10

70 parts of a reactive dye of above-mentioned formula (1), 20 parts of a compound represented by the following formula (8),

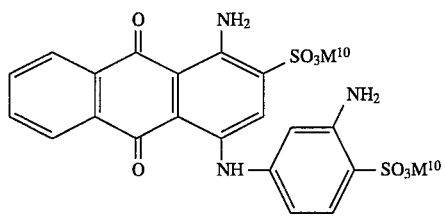

in which $M^{10}$ is H or Na, 15 parts of a condensation product of monomethylnaphthalene sulfonic acid having a sulfonation degree of 110% with formaldehyde (sodium salt) of which the average condensation degree is 1.8 and 5 parts of anhydrous sodium sulfonate were fully mixed to obtain a reactive dye composition.

Using 5 kg of the reactive dye composition thus obtained, 5 kg of pure, 58 kg of 4% aqueous solution of sodium alginate, 30 kg of water and 2 kg of sodium hydrogen carbonate, a printing paste was prepared. According to a conventional manner, No. 40 mercerized cotton broadcloth was printed with the printed paste thus obtained, then dried and further steamed at 100° C. for 3 minutes. Then, the printed cloth was finished by rinsing it with cold and hot water, soaping, again rinsing it with hot and cold water and drying it. A deep, level and brilliant blue dyed product free from specks was obtained.

Above-mentioned printing process was repeated several times and the results exhibited good dyeing reproducibility.

EXAMPLE 11

65 parts of a reactive dye of the above-mentioned formula (1), 20 parts of a reactive dye of the above-mentioned formula (3), 30 parts of a compound represented by the following formula (9),

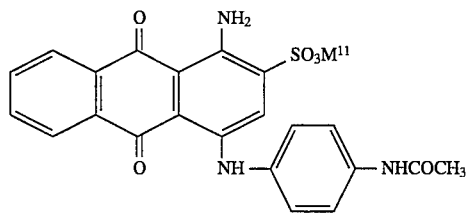

in which $M^{11}$ is H or Na, 5 parts of a condensation product of dimethylnaphthalene sulfonic acid having a sulfonation degree of 110% with formaldehyde (sodium salt) of which the average condensation degree is 1.8 and 10 parts of anhydrous sodium sulfonate were fully mixed to obtain a reactive dye composition.

(a) 100 g of the reactive dye composition thus obtained was dissolved in hot water and 1 g of sodium alginate was added thereto to obtain 1 l (25° C.) of solution. Using the solution, a cotton fabric was padded according to a known manner and dried at 120° C. for 1 minute to obtain a dyed cloth.

(b) An alkaline solution (2) was prepared by adding 10 g of sodium metanitrobenzenesulfonate, 250 g of sodium chloride and 20 ml of 40° Bé aqueous sodium hydroxide solution to 800 ml of 50° C. water.

(c) The dyed cloth obtained in (a) was further padded with the alkaline solution (2), and then steamed at 100° C. for 30 seconds. Then, the dyed fabric was rinsed in a conventional manner to remove the unfixed dye and finished by drying. A deep, level and brilliant blue dyed product free from specks was obtained.

Above-mentioned dyeing process was repeated several times and the results exhibited good dyeing reproducibility.

EXAMPLE 12

75 parts of a reactive dye of above-mentioned formula (1), 20 parts of a compound represented by the following formula (10),

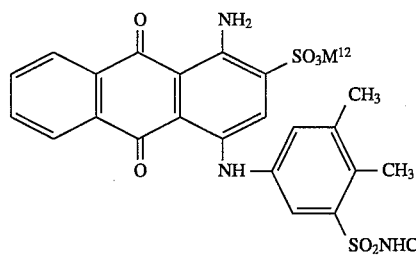

in which $M^{12}$ is H or Na, 15 parts of a condensation product of monomethylnaphthalene sulfonic acid having a sulfonation degree of 110% with formaldehyde (sodium salt) of which the average condensation degree is 1.8 and 1 parts of anhydrous sodium sulfonate were fully mixed to obtain a reactive dye composition.

(a) 100 g of the reactive dye composition thus obtained was dissolved in hot water and then the solution was cooled to 25° C. To the solution, 28 ml of 40° Bé sodium hydroxide and 30 g of sodium sulfate were added and then water was further added to prepare 1 l of a padding liquor. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left for 10 hours. Then, the dyed fabric was rinsed in a conventional manner to remove the unfixed dye and finished by drying. A deep, level and brilliant blue dyed product free from specks was obtained.

EXAMPLE 13

80 parts of a reactive dye of above-mentioned formula (1), 20 parts of a compound represented by the following formula (11),

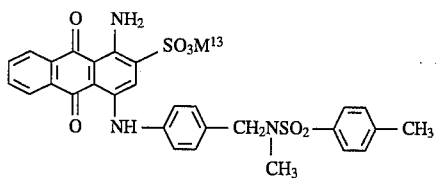

(11)

in which $M^{13}$ is H or Na, 15 parts of a condensation product of monomethylnaphthalene sulfonic acid having a sulfonation degree of 110% with formaldehyde (sodium salt) of which the average condensation degree is 1.8 and 1 parts of anhydrous sodium sulfonate were fully mixed to obtain a reactive dye composition.

100 g of the reactive dye composition thus obtained was dissolved in hot water and then the solution was cooled to 25° C. To the solution, 28 ml of 40° Bé sodium hydroxide and 30 g of sodium sulfate were added and then water was further added to prepare 1 l of a padding liquor. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left for 10 hours. Then, the dyed fabric was rinsed in a conventional manner to remove the unfixed dye and finished by drying. A deep, level and brilliant blue dyed product free from specks was obtained.

EXAMPLE 14

80 parts of a reactive dye of above-mentioned formula (1), 20 parts of a compound represented by the following formula (12),

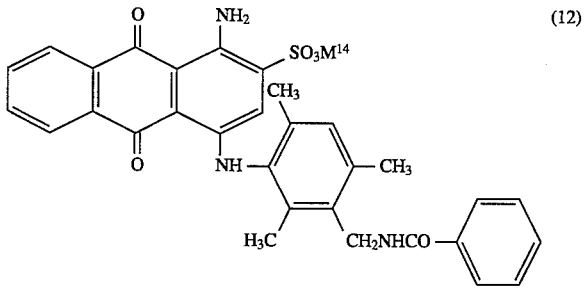

(12)

in which $M^{14}$ is H or Na, 15 parts of a condensation product of monomethylnaphthalene sulfonic acid having a sulfonation degree of 110% with formaldehyde (sodium salt) of which the average condensation degree is 1.8 and 1 parts of anhydrous sodium sulfonate were fully mixed to obtain a reactive dye composition.

(a) 100 g of the reactive dye composition thus obtained was dissolved in hot water and then the solution was cooled to 25° C. To the solution, 28 ml of 40° Bé sodium hydroxide and 30 g of sodium sulfate were added and then water was further added to prepare 1 l of a padding liquor. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left for 10 hours. Then, the dyed fabric was rinsed in a conventional manner to remove the unfixed dye and finished by drying. A deep, level and brilliant blue dyed product free from specks was obtained.

EXAMPLE 15

100 parts of a reactive dye of above-mentioned formula (1), 17 parts of a compound represented by the following formula (13),

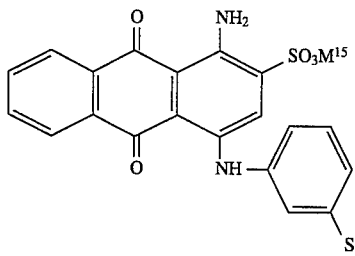

(13)

in which $M^{15}$ is H or Na, 15 parts of a condensation product of monomethylnaphthalene sulfonic acid having a sulfonation degree of 110% with formaldehyde (sodium salt) of which the average condensation degree is 1.8 and 1 parts of anhydrous sodium sulfonate were fully mixed to obtain a reactive dye composition.

(a) 100 g of the reactive dye composition thus obtained was dissolved in hot water and then the solution was cooled to 25° C. To the solution, 150 g of 50° Bé sodium hydroxide 15 ml of 35% aqueous hydroxide were added and then water was further added to prepare 1 l of a padding liquor at 25° C. Immediately after the preparation of the padding liquor, a cotton fabric was treated in a known manner with this padding liquor, and then batched up immediately and enveloped all over in a polyethylene film to be away from ambient atmosphere. During the padding operation, no aggregation was observed in the padding liquor. The enveloped cotton fabric was left in am ambient temperature of 28° C. for 10 hours. Then, the dyed fabric was rinsed in a conventional manner to remove the unfixed dye and finished by drying. A deep, level and brilliant blue dyed product free from specks was obtained.

EXAMPLE 16

200 kg of blended knitting of 35% cotton fabric and 65% polyester fabric was set in a high pressure jet-dyeing machine, the bath ratio and water temperature were adjusted at 1:10 and 80° C., respectively and bath pH was also adjusted at 5 by using acetic acid.

Using a disperse system containing 1.3 kg of a dispersion dye represented by the following formula (14);

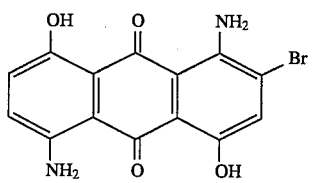

(14)

and 0.2 kg of Sumipon TF (a dispersant manufactured by Sumitomo Chemical Co., Ltd.) which were fully dispersed in advance, the polyester fabric of the blended knitting was dyed by raising the bath temperature to 130° C. over 40 minutes and keeping the temperature for 30 minutes. Then, the dyeing liquor was discharged, and water was added to the dyeing machine again to adjust the bath ratio at 1:10 and water temperature at 60° C. To the bath, a dye solution containing 3 kg of the reactive dye solution obtained in Example 4 which had been dissolved previously and 60 kg of anhydrous sodium sulfonate were added, and then the knitting was treated at that temperature for 20 minutes. After 30 kg of sodium carbonate was added thereto according to a known method, the knitting was further treated at that temperature for 45 minutes to finish the dyeing. The dyed fabric was rinsed in a conventional manner and a deep, level and brilliant blue dyed product free from specks was obtained.

Above-mentioned dyeing process was repeated several times and the results exhibited good dyeing reproducibility.

EXAMPLE 17

100 kg of knitting of cotton fabric was set in a wince dyeing machine and the bath ratio and water temperature were adjusted at 1:15 and 60° C., respectively.

To the dye bath, 0.6 kg of the reactive dye composition obtained in Example 4 which had been dissolved previously; 0.6 kg of the dye represented by the following formula (15),

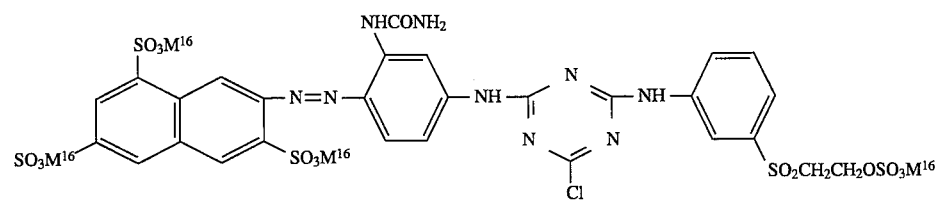

in which $M^{16}$ is H or Na, and which had been dissolved previously; and 0.6 kg of the dye represented by the following formula (16),

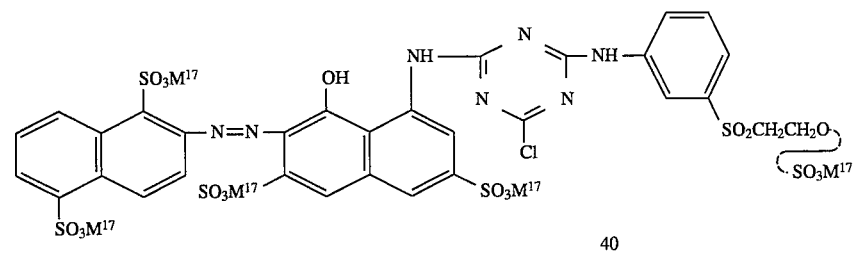

in which $M^{17}$ is H or Na, and which had been dissolved previously was added according to a known method and then 45 kg of anhydrous sodium sulfate was further added thereto at that temperature according to a known method. Thereafter, the knitting was treated for 20 minutes at that temperature. Then, sodium carbonate, the total amount of the sodium carbonate being 30 kg, was added to the bath in two times according to a known manner. The knitting was further treated for 60 minutes at that temperature to finish the dyeing.

The dyed fabric was rinsed in a conventional manner and a level brown dyed product free from specks was obtained.

Above-mentioned dyeing process was repeated several times and the results exhibited good dyeing reproducibility.

EXAMPLE 18

200 kg of knitting of rayon fabric was set in a low bath ratio jet dyeing machine and the bath ratio and water temperature were adjusted at 1:15 and 60° C., respectively.

To the dye bath, 0.5 kg of the reactive dye composition obtained in Example 7 which had been dissolved previously; 0.5 kg of dye of the above-mentioned formula (15); 0.5 kg of dye of the above-mentioned formula (16); and 18 kg of anhydrous sodium sulfate was further added thereto at that temperature according to a known manner. In the bath, the knitting was treated for 30 minutes at that temperature, and the, 4.8 kg of sodium carbonate was added thereto. The knitting was further treated for 40 minutes at that temperature to finish the dyeing. No deposition, no aggregation of the dye or the like was observed. A brown dyed product free from specks was obtained.

Above-mentioned dyeing process was repeated several times and the results exhibited good dyeing reproducibility.

What we claim is:

1. A reactive dye composition which contains a dye mixture comprising:

100 parts by weight of at least one reactive dye selected from dyes represented by the following formula (I):

in which Q is —$SO_2CH_2CH_2Z$ in which Z is a group splittable by the action of alkali or —$SO_2CH=CH_2$, and $M^1$ is hydrogen, an alkali metal or an alkaline earth metal; and 1 or more parts by weight of at least one anthraquinone compound usable as an acid dye which is a compound represented by formula (II):

in which C is cyclohexyl, unsubstituted phenyl or phenyl which is substituted by halogen, sulfo, cyano, $C_1$–$C_{12}$ alkyl, $C_1$–$C_4$ alkoxycarbonyl, $C_1$–$C_4$ alkylsulfonyl optionally substituted with hydroxy, —NR$^1$R$^2$, —SO$_2$NR$^1$R$^2$ or CH$_2$NR$^1$R$^2$ in which R$^1$ is hydrogen, C$_1$–C$_4$ alkyl or hydroxyethyl and R$^2$ is hydrogen, C$_1$–C$_4$ alkyl optionally substituted once or twice, which may be the same or different, with chlorine or hydroxy, C$_1$–C$_4$ alkylcarbonyl optionally substituted once or twice, which may be the same or different, with chlorine or hydroxy, phenylcarbonyl, optionally substituted with C$_1$–C$_4$ alkyl, C$_1$–C$_4$ alkylsulfonyl optionally substituted once or twice, which may be the same or different, with chlorine or hydroxy or phenylsulfonyl optionally substituted with C$_1$–C$_4$ alkyl; and M$^2$ is hydrogen, an alkali metal or an alkaline earth metal.

2. A reactive dye composition according to claim 1, in which the dye mixture comprises a reactive dye of the formula (I) in which Q is —SO$_2$CH$_2$CH$_2$OSO$_3$H.

3. A reactive dye composition according to claim 1, in which the dye mixture comprises both a reactive dye of the formula (I) in which Q is —SO$_2$CH$_2$CH$_2$OSO$_3$H and a reactive dye of the formula (I) in which Q is —SO$_2$CH=CH$_2$.

4. A reactive dye composition according to claim 1, in which X in the formula (II) is phenyl which is substituted by at least one group selected from sulfo, C$_1$ to C$_4$ alkyl, amino or acetyl amino.

5. A reactive dye composition according to claim 1, in which X in the formula (II) is cyclohexyl.

6. A reactive dye composition according to claim 1, in which X in the formula (II) is unsubstituted phenyl.

7. A reactive dye composition according to claim 1 which further contains a condensation product of optionally alkylated naphthalene sulfonic acid and formaldehyde.

8. A process for dyeing or printing a fiber material which can be dyed with a reactive dye by subjecting the fiber material to dyeing or printing by applying a reactive dye composition according to claim 1 to the material.

9. A process for dyeing or printing a fiber material which can be dyed with a reactive dye by subjecting the fiber material to dyeing or printing by applying a reactive dye composition according to claim 2 to the material.

10. A process for dyeing or printing a fiber material which can be dyed with a reactive dye by subjecting the fiber material to dyeing or printing by applying a reactive dye composition according to claim 3 to the material.

11. A process for dyeing or printing a fiber material which can be dyed with a reactive dye by subjecting the fiber material to dyeing or printing by applying a reactive dye composition according to claim 5 to the material.

12. A process for dyeing or printing a fiber material which can be dyed with a reactive dye by subjecting the fiber material to dyeing or printing by applying a reactive dye composition according to claim 6 to the material.

13. A process for dyeing or printing a fiber material which can be dyed with a reactive dye by subjecting the fiber material to dyeing or printing by applying a reactive dye composition according to claim 7 to the material.

14. A process for dyeing or printing a fiber material which can be dyed with a reactive dye by subjecting the fiber material to dyeing or printing by applying using a reactive dye composition according to claim 7 to the material.

* * * * *